(12) United States Patent
Demos

(10) Patent No.: US 7,236,695 B1
(45) Date of Patent: Jun. 26, 2007

(54) PHOTOGRAPHIC BACKDROP WITH STAND

(76) Inventor: Nicholas S. Demos, 3929 E. Birchwood, Cudahy, WI (US) 53110

(*) Notice: Subject to any disclaimer, the term of this patent is extended or adjusted under 35 U.S.C. 154(b) by 204 days.

(21) Appl. No.: 11/019,327

(22) Filed: Dec. 22, 2004

(51) Int. Cl.
*G03B 15/06* (2006.01)

(52) U.S. Cl. .............................................. 396/3; 16/241
(58) Field of Classification Search .................... 396/3, 396/1, 429; D16/241; 362/3, 16, 18
See application file for complete search history.

(56) References Cited

U.S. PATENT DOCUMENTS

| | | | | |
|---|---|---|---|---|
| 3,942,869 A | * | 3/1976 | Portner et al. .............. | 359/443 |
| 4,017,152 A | * | 4/1977 | Allen .......................... | 359/443 |
| 6,454,227 B1 | * | 9/2002 | LaMotte ..................... | 248/165 |

* cited by examiner

*Primary Examiner*—W. B. Perkey
*Assistant Examiner*—Rishi S. Suthar
(74) *Attorney, Agent, or Firm*—Donald J. Ersler

(57) ABSTRACT

A photographic backdrop with stand includes a photographic backdrop and a support structure. The photographic backdrop includes a backdrop screen and four pockets attached to the four corners of the backdrop screen. The support structure includes a photographic light stand, a base connector and four support rods. Each support rod includes a substantially triangular end. The photographic light stand includes a vertical mounting tube. The vertical mounting tube is inserted into a bottom of the base connector. The four support rods are also inserted into pre-existing holes in the base connector. The backdrop screen is stretched over the four support rods, such that the four substantially triangular ends are inserted into the four pockets. Four extension rods may be used to extend the length of the four support rods for larger backdrop screens.

18 Claims, 2 Drawing Sheets

PHOTOGRAPHIC BACKDROP WITH STAND

BACKGROUND OF THE INVENTION

1. Field of the Invention

The present invention relates generally to photography and more specifically to a photographic backdrop with stand, which includes a support structure that may be disassembled and collapsed into short lengths for storage in a small bag.

2. Discussion of the Prior Art

There are numerous photographic backdrops assemblies in the art. Many of the photographic backdrop assemblies are collapsible or may be disassembled for storage and transportation. However, the photographic backdrop assemblies in the art collapse or disassemble into fairly large elements.

Accordingly, there is a clearly felt need in the art for a photographic backdrop with stand, which includes a support frame that may be disassembled and collapsed into short lengths and stored in a small bag with a folded backdrop.

SUMMARY OF THE INVENTION

The present invention provides a photographic backdrop with stand, which may be disassembled, collapsed and stored in a small bag. The photographic backdrop with stand includes a photographic backdrop and a support structure. The photographic backdrop includes a backdrop screen and four pockets attached to the four corners of the backdrop screen. The support structure includes a photographic light stand, a base connector and four support rods. The photographic light stand includes a vertical mounting tube. The base connector includes a stand opening that is sized to receive the vertical mounting tube. A first lower rod opening is formed in the base connector at an acute angle, clockwise from the stand opening and a second lower rod opening is formed in the base connector at an acute angle, counter clockwise from the stand opening. A first upper rod opening is formed in the base connector at an obtuse angle, clockwise from the stand opening and a second upper rod opening is formed in the base connector at an obtuse angle, counter clockwise from the stand opening.

A substantially triangular end is preferably formed on one end of the support rod. Each pocket is shaped to receive the substantially triangular end. An extension rod is preferably used to increase the length of each support rod, if a larger backdrop screen is needed. A rod sleeve is attached to one end of the extension rod with any suitable method. The rod sleeve is preferably a metallic tube, but other retention devices may also be used. An inner perimeter of the rod sleeve is sized to receive the other end of the support rod. The other end of the extension rod has the same outer perimeter as the other end of the support rod.

The photographic backdrop with stand is preferably assembled in the follow manner. The base connector is laid on a horizontal surface. Each support rod is inserted into a single extension rod. The four extension rods are inserted into the four rod openings in the base connector. One of the four pockets of the backdrop screen is placed over one of the substantially triangular ends. The pocket opposite, the first inserted pocket is stretched over a second substantially triangular end. The two remaining pockets are stretched over the two remaining substantially triangular ends. The vertical tube of the photographic light stand is inserted into the stand opening in the base connector. The height of the vertical tube is adjusted, such that a bottom of the backdrop screen, just contacts a support surface.

Accordingly, it is an object of the present invention to provide a photographic backdrop with stand, which includes a support structure that may be disassembled and collapsed into short lengths and stored in a small bag with a folded backdrop.

These and additional objects, advantages, features and benefits of the present invention will become apparent from the following specification.

DETAILED DESCRIPTION OF THE PREFERRED EMBODIMENTS

Figure 1:
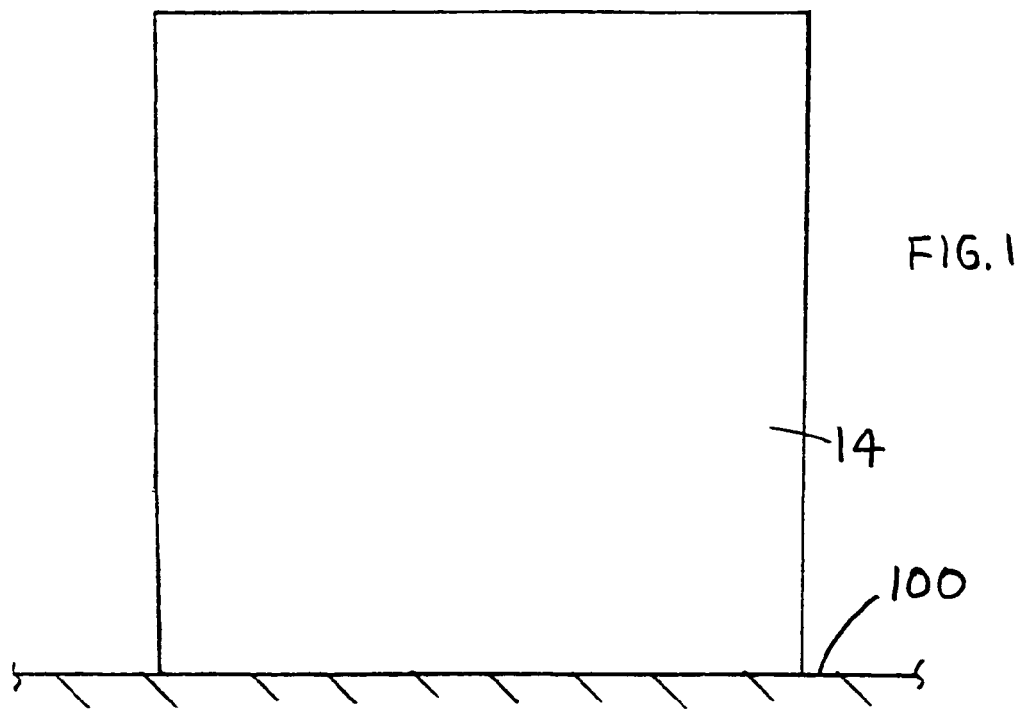
FIG. 1 is a front view of a photographic backdrop with stand in accordance with the present invention.
Figure 2:
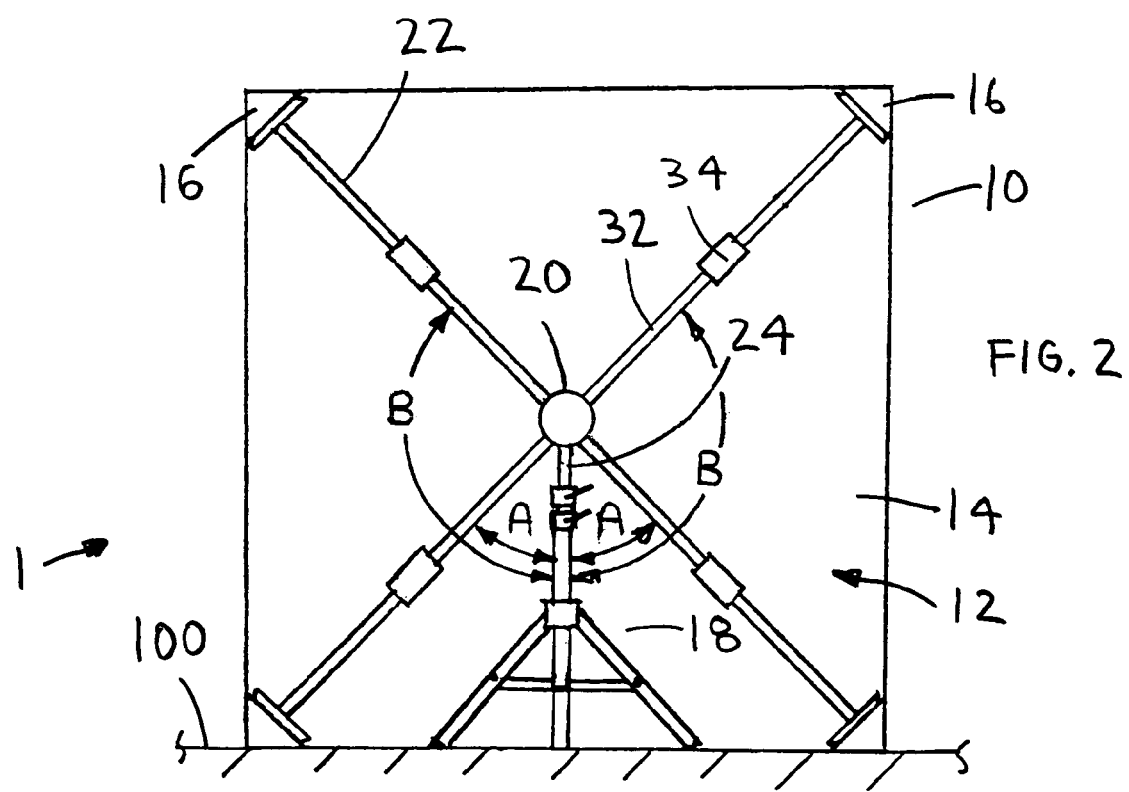
FIG. 2 is a rear view of a photographic backdrop with stand in accordance with the present invention.
Figure 3:
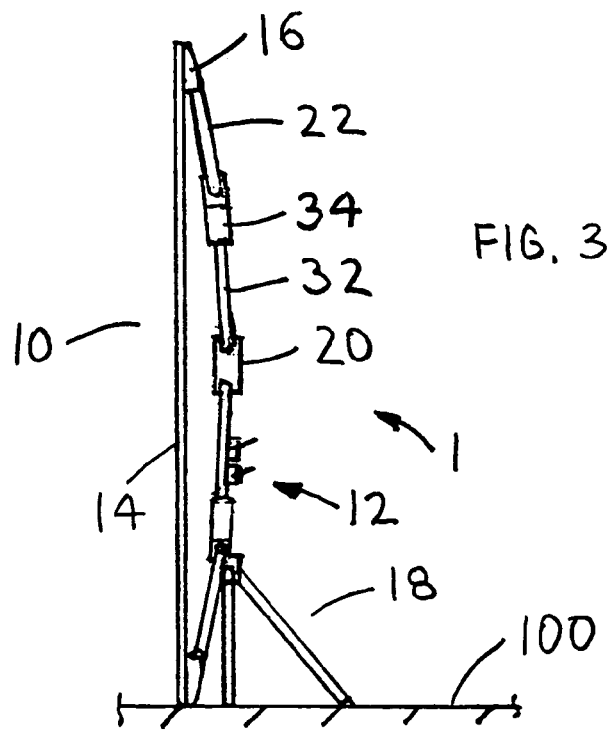
FIG. 3 is a side view of a photographic backdrop with stand in accordance with the present invention.

With reference now to the drawings, and particularly to FIG. 1, there is shown a front view of a photographic backdrop with stand 1. With reference to FIGS. 2–3, the photographic backdrop with stand 1 includes a photographic backdrop 10 and a support structure 12. The photographic backdrop 10 includes a backdrop screen 14 and four pockets 16 attached to the four corners of the backdrop screen 14. The backdrop screen 14 is preferably fabricated from a sheet of muslin material. A background design is applied to the muslin material with any suitable method. Muslin material has the property of stretchability. However, other stretchable materials besides muslin material may also be used.

The support structure 12 includes a photographic light stand 18, a base connector 20 and four support rods 22. Photographic light stands are well known in the art and do not need to be explained in detail. The photographic light stand 18 includes a vertical mounting tube 24. The height of the vertical mounting tube 24 of the photographic stand 18 must be adjustable to vertically position the backdrop screen 14 relative to a support surface 100.

The base connector 20 includes a stand opening that is sized to receive the vertical mounting tube 24. A first lower rod opening is formed in the base connector 20 at an angle "A", clockwise from the stand opening and a second lower rod opening is formed in the base connector 20 at an angle "A", counter clockwise from the stand opening. If the backdrop screen 14 has a square shape as illustrated in the figures, angle "A" would be 45 degrees. A first upper rod opening is formed in the base connector 20 at an angle "B", clockwise from the stand opening and a second upper rod opening is formed in the base connector 20 at an angle "B", counter clockwise from the stand opening. If the backdrop screen 14 has a square shape as illustrated in the figures, angle "B" would be 135 degrees. However, the backdrop screen 14 may have other shapes, besides square.

Figure 4:
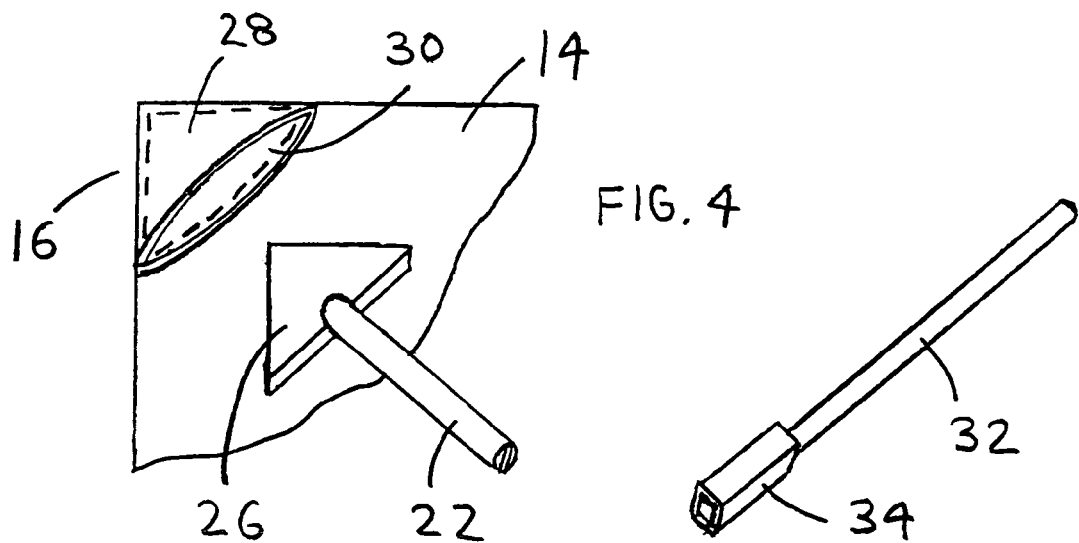
FIG. 4 is an enlarged perspective view of an of a substantially triangular end of a support rod before insertion into a pocket of a backdrop screen of a photographic backdrop with stand in accordance with the present invention.
Figure 5:
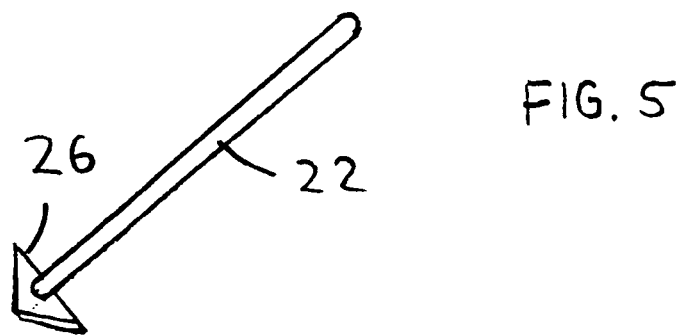
FIG. 5 is a perspective view of a support rod before insertion into a rod sleeve of an extension rod of a photographic backdrop with stand in accordance with the present invention.

With reference to FIG. 4, a substantially triangular end 26 is preferably formed on one end of the support rod 22. Each pocket 16 is shaped to receive the substantially triangular end 26. Each pocket 16 preferably includes a first pocket sheet 28 and a second pocket sheet 30. The first and second pocket sheets are preferably sewn to a corner of the backdrop screen 14, but other attachment methods may also be used. The substantially triangular end 26 is inserted between the first and second pocket sheets. With reference to FIG. 5, an extension rod 32 is preferably used to increase the length of each support rod 22, if a larger backdrop screen is need. A rod sleeve 34 is attached to one end of the extension rod 32 with any suitable method. The rod sleeve 34 is preferably a metallic tube, but other retention devices may also be used. An inner perimeter of the rod sleeve 34 is sized to receive the other end of the support rod 22. The other end of the extension rod 32 has the same outer perimeter as the other end of the support rod 22.

The photographic backdrop with stand 1 is preferably assembled in the follow manner. The base connector 20 is laid on a horizontal surface. Each support rod 22 is inserted into a single rod sleeve 34 of the extension rod 32. The four extension rods 32 are inserted into the four rod openings in the base connector 20. If the four extension rods 32 are not used, the four support rods 22 are inserted into the four rod openings in the base connector 20. One of the four pockets 16 of the backdrop screen is placed over one of the substantially triangular ends 26. The pocket opposite, the first inserted pocket is stretched over a second substantially triangular end. The two remaining pockets are stretched over the two remaining substantially triangular ends. The vertical mounting tube 24 of the light stand is inserted into the stand opening in the base connector 20. A height of the vertical tube 24 is adjusted, such that a bottom of the backdrop screen 14, just contacts the support surface 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing a self-supporting photographic backdrop, comprising the steps of:
   providing a stand having a vertical mounting tube;
   providing four support rods;
   providing a backdrop screen with a pocket formed in each corner thereof, said pocket including a first sheet and a second sheet;
   inserting said four support rods into a base connector;
   inserting the other ends of said four support rods between said first sheet and said second sheet in each corner of said backdrop screen; and
   inserting said vertical mounting tube into said base connector.

2. The method of providing a self-supporting photographic backdrop of claim 1, further comprising the step of:
   fabricating said backdrop screen from a stretchable material.

3. The method of providing a self-supporting photographic backdrop of claim 1, further comprising the step of:
   applying a background design to said backdrop screen.

4. The method of providing a self-supporting photographic backdrop of claim 1, further comprising the step of:
   extending said four support rods with four extension rods.

5. The method of providing a self-supporting photographic backdrop of claim 1, further comprising the step of:
   forming a substantially triangular end on the other end of each one of said four support rods.

6. The method of providing a self-supporting photographic backdrop of claim 1, further comprising the step of:
   adjusting a height of said backdrop screen relative to a support surface by adjusting the height of said vertical mounting tube.

7. A method of providing a self-supporting photographic backdrop, comprising the steps of:
   providing a stand having a vertical mounting tube;
   providing four support rods;
   providing a backdrop screen with a pocket formed in each corner thereof, said pocket including a first sheet and a second sheet, fabricating said backdrop screen from a stretchable material;
   inserting said four support rods into a base connector;
   inserting the other ends of said four support rods between said first sheet and said second sheet in each corner of said backdrop screen; and
   inserting said vertical mounting tube into said base connector.

8. The method of providing a self-supporting photographic backdrop of claim 7, further comprising the step of:
   applying a background design to said backdrop screen.

9. The method of providing a self-supporting photographic backdrop of claim 7, further comprising the step of:
   extending said four support rods with four extension rods.

10. The method of providing a self-supporting photographic backdrop of claim 7, further comprising the step of:
    forming a substantially triangular end on the other end of each one of said four support rods.

11. The method of providing a self-supporting photographic backdrop of claim 7, further comprising the step of:
    adjusting a height of said backdrop screen relative to a support surface by adjusting the height of said vertical mounting tube.

12. The method of providing a self-supporting photographic backdrop of claim 7, further comprising the step of:
    providing a photographic light stand for said stand.

13. A method of providing a self-supporting photographic backdrop, comprising the steps of:
    providing a stand having a vertical mounting tube;
    providing four support rods;
    providing a backdrop screen with a pocket formed in each corner thereof, said pocket including a first sheet and a second sheet;
    inserting said four extension rods into a base connector, forming a substantially triangular end on the other end of each one of said four support rods;

inserting the other ends of said four support rods between said first sheet and said second sheet in each corner of said backdrop screen; and inserting said vertical mounting tube into said base connector.

14. The method of providing a self-supporting photographic backdrop of claim 13, further comprising the step of:

applying a background design to said backdrop screen.

15. The method of providing a self-supporting photographic backdrop of claim 13, further comprising the step of:

adjusting a height of said backdrop screen relative to a support surface by adjusting the height of said vertical mounting tube.

16. The method of providing a self-supporting photographic backdrop of claim 13, further comprising the step of:

providing a photographic light stand for said stand.

17. The method of providing a self-supporting photographic backdrop of claim 13, further comprising the step of:

fabricating said backdrop screen from a stretchable material.

18. The method of providing a self-supporting photographic backdrop of claim 13, further comprising the step of:

extending said four support rods with four extension rods.

* * * * *